(No Model.)
J. H. FREEMAN, Jr.
WEIGHING AND COMPUTING SCALES.
No. 431,456. Patented July 1, 1890.
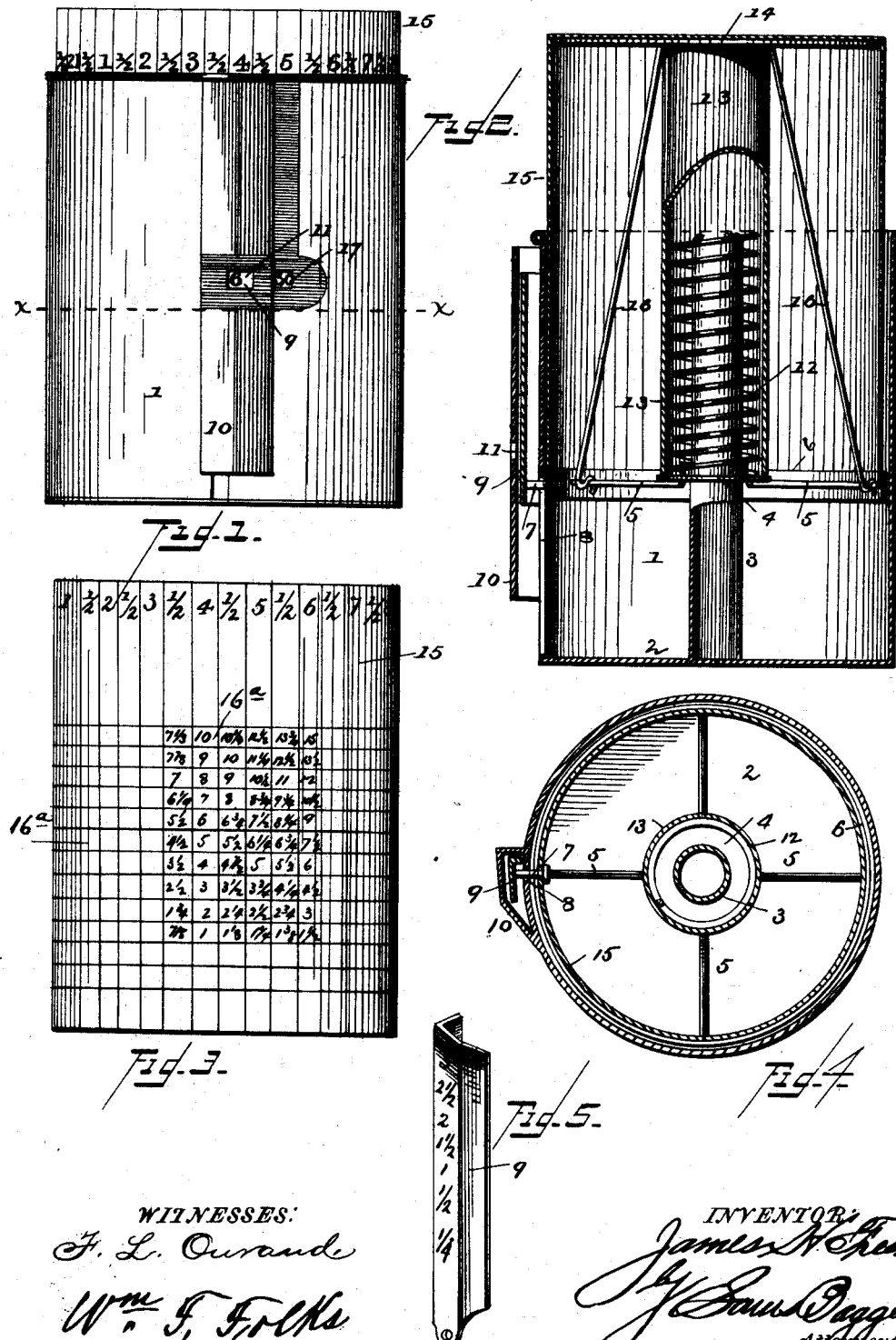
WITNESSES:
INVENTOR:

UNITED STATES PATENT OFFICE.

JAMES HOLMAN FREEMAN, JR., OF HOWARD, COLORADO.

WEIGHING AND COMPUTING SCALES.

SPECIFICATION forming part of Letters Patent No. 431,456, dated July 1, 1890.

Application filed January 10, 1890. Serial No. 336,477. (No model.)

*To all whom it may concern:*

Be it known that I, JAMES HOLMAN FREEMAN, Jr., a citizen of the United States, and a resident of Howard, in the county of Fremont and State of Colorado, have invented certain new and useful Improvements in Combined Weighing and Computing Scales; and I do hereby declare that the following is a full, clear, and exact description of the invention, which will enable others skilled in the art to which it appertains to make and use the same.

My invention relates to improvements in combined weighing and computing scales, whereby a great saving in time and labor is effected and absolute accuracy in computing the price of the article or substances weighed is insured.

The object of the invention is to provide a device which shall be economical in construction, durable, reliable, effective, and accurate in use, and in which the correct weight of the articles or substances placed therein can not only be readily ascertained, but the price thereof or amount for which they are to be sold will be automatically and accurately indicated, thus effecting a great saving in time, avoiding mental strain or trouble in computing prices, and insuring absolute accuracy in charging for the articles sold.

My invention consists in the novel construction and new combinations of parts hereinafter fully described, and then definitely pointed out in the appended claims.

In the accompanying drawings, Figure 1 is a side elevation of my improved weighing and computing scales. Fig. 2 is a vertical sectional view through the center of the same. Fig. 3 is an elevation of the inner movable cylinder. Fig. 4 is a cross-section on line *x* *x*, Fig. 1; and Fig. 5 is a detail view of the scale.

In the said drawings the reference-numeral 1 indicates a cylinder of heavy tin or sheet-iron about six and one-half inches in diameter and seven inches high. It has a closed bottom 2, in the center of which is secured the upright 3, which may consist of a piece of ordinary gas-pipe. Encircling this upright, so as to move freely up and down thereon, is a collar 4, connected by two or more radial arms 5 to the band or annular rim 6, of a diameter slightly less than the interior of casing or cylinder 1, so as to move vertically therein. Secured to this band or rim is a short arm or stud 7, which projects through a slot 8 in the cylinder 1, said slot extending from the bottom to about midway of the height thereof. The arm 7 is secured to the lower end of a scale 9, which is inclosed within the casing or housing 10, which is provided with an aperture 11, through which the characters on the scale can be seen. These characters are the usual numerals for indicating pounds and fractions thereof found upon ordinary scales.

Encircling the upright 3, with one end resting upon the collar 4 and its other end bent over upon or secured to the top of the upright, is a coiled spring 12, and encircling and inclosing this spring is a tube 13, carrying at its upper end a disk 14, upon which the cylinder 15 rests. From the top of this tube depend two or more braces 16, which consist of wires or rods secured to the tube at their upper ends, while their lower ends are bent upward a short distance and then downward to form hooks which engage with the band or rim 6. The arrangement of the coiled spring and tube 13 is such that the cylinder 15, which rests upon the disk 14 of the latter, when in its normal position protrudes about half its height above the top of cylinder 1. The surface of cylinder 15 is divided into rectangular spaces 16$^a$ by vertical and horizontal lines, and in the spaces in the upper half of the cylinder, from left to right, are consecutively arranged numerals from 1 upward, indicating the price per pound at which the articles weighed are to be sold. The spaces on the lower half of the cylinder are occupied by figures denoting the amount of the number at the top of the column (the price) multiplied by the number of pounds or fractions of pounds which would be required to press the cylinder 15 down till said space would come before an aperture or opening 17 in casing or cylinder 1, which number of pounds or fractions thereof is correspondingly marked on the scale 9, which can be viewed through the aperture 11 in the casing or housing 10. In other words, the sum indicated at the opening 17 represents the price indicated at the top of the column multiplied by the number of pounds indicated at aperture 11.

A scoop may be secured to the top of cylinder 15 for holding the articles to be weighed in any convenient manner.

The operation is as follows: Place the object to be weighed in the scoop or on top of cylinder 15, and the figures which show through the aperture 11 will indicate the weight of the object. To ascertain the cost of the object at a given price per pound, turn the cylinder 15 till the price per pound sought appears in the column directly above the aperture 17 in cylinder 1, when the sum seen therethrough will represent the cost of the object.

Having thus described my invention, what I claim is—

1. The combination, with the cylinder 1, having the slot 8, aperture 17, the housing 10, having aperture 11, and the arm 7, projecting through slot 8 and carrying the scale 9, of the cylinder 15, having figures at its upper portion indicating the price per pound of objects to be weighed, and at its lower portion with figures indicating the aggregate price of the number of pounds the object weighed, substantially as described.

2. The combination, with cylinder 1, having aperture 11, housing 10, with aperture 17, the arm 7, scale 9, upright 3, collar 4, rim or band 6, coiled spring 12, and tube 13, having disk 14, of the cylinder 15, movable within cylinder 1 and resting upon disk 14, and having upon its surface rectangular spaces bearing numerals indicating, respectively, the price per pound of the articles to be weighed and the aggregate cost of the number of pounds, substantially as described.

In testimony that I claim the foregoing as my own I have hereunto affixed my signature in presence of two witnesses.

JAMES HOLMAN FREEMAN, JR.

Witnesses:
FREDERIC WATSON GIBBS,
KELLEY PHENE ALLRED.